US008332777B2

(12) United States Patent  
Corbett et al.

(10) Patent No.: US 8,332,777 B2
(45) Date of Patent: *Dec. 11, 2012

(54) APPARATUS, SYSTEM AND METHOD FOR CONTEXT AND LANGUAGE SPECIFIC DATA ENTRY

(75) Inventors: Kevin Corbett, Rescue, CA (US); Brian David Johnson, Portland, OR (US); Dave Koste, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/648,526

(22) Filed: Dec. 29, 2009

(65) Prior Publication Data

US 2010/0107106 A1    Apr. 29, 2010

Related U.S. Application Data

(63) Continuation of application No. 11/521,973, filed on Sep. 14, 2006, now Pat. No. 7,673,254.

(51) Int. Cl.
*G06F 13/00* (2006.01)
*G06F 15/00* (2006.01)

(52) U.S. Cl. ...................... 715/824; 715/711

(58) Field of Classification Search .......... 715/821–824, 715/851–854, 763–765, 711
See application file for complete search history.

(56) References Cited

U.S. PATENT DOCUMENTS

| 5,838,314 A * | 11/1998 | Neel et al. ................ 725/8 |
| 7,673,254 B2 | 3/2010 | Corbet et al. |
| 2005/0076383 A1 * | 4/2005 | Upendran et al. .......... 725/109 |
| 2007/0041540 A1 * | 2/2007 | Shao et al. ................ 379/142.01 |

OTHER PUBLICATIONS

Thurrott, P., "Windows XP Media Center Edition 2005 Review", 2004, pp. 1-21, retrieved on Sep. 7, 2006, <http://www.winsupersite.com/reviews/windowsxp_mce2005.asp>.

* cited by examiner

*Primary Examiner* — Cao "Kevin" Nguyen
(74) *Attorney, Agent, or Firm* — Garrett IP, LLC

(57) ABSTRACT

An apparatus, system and method that allow for context and language specific data entry via a user interface. A user interface is displayed on a display device, where the user interface includes a data entry menu having one or more menu selections. A menu selection is activated. A data entry method is displayed, where the data entry method is context and language specific to the activated menu selection. Other embodiments are described and claimed.

39 Claims, 9 Drawing Sheets

APPARATUS, SYSTEM AND METHOD FOR CONTEXT AND LANGUAGE SPECIFIC DATA ENTRY

This application is a continuation of U.S. patent application Ser. No. 11/521,973 filed Sep. 14, 2006 now U.S. Pat. No. 7,673,254, entitled "APPARATUS, SYSTEM AND METHOD FOR CONTEXT AND LANGUAGE SPECIFIC DATA ENTRY."

BACKGROUND

Television (TV) display user interfaces have design lay outs to receive information from a standard TV remote control. However, navigation and/or manipulation of a today's user interfaces are slow and confusing via a standard TV remote control.

DETAILED DESCRIPTION

Figure 1:
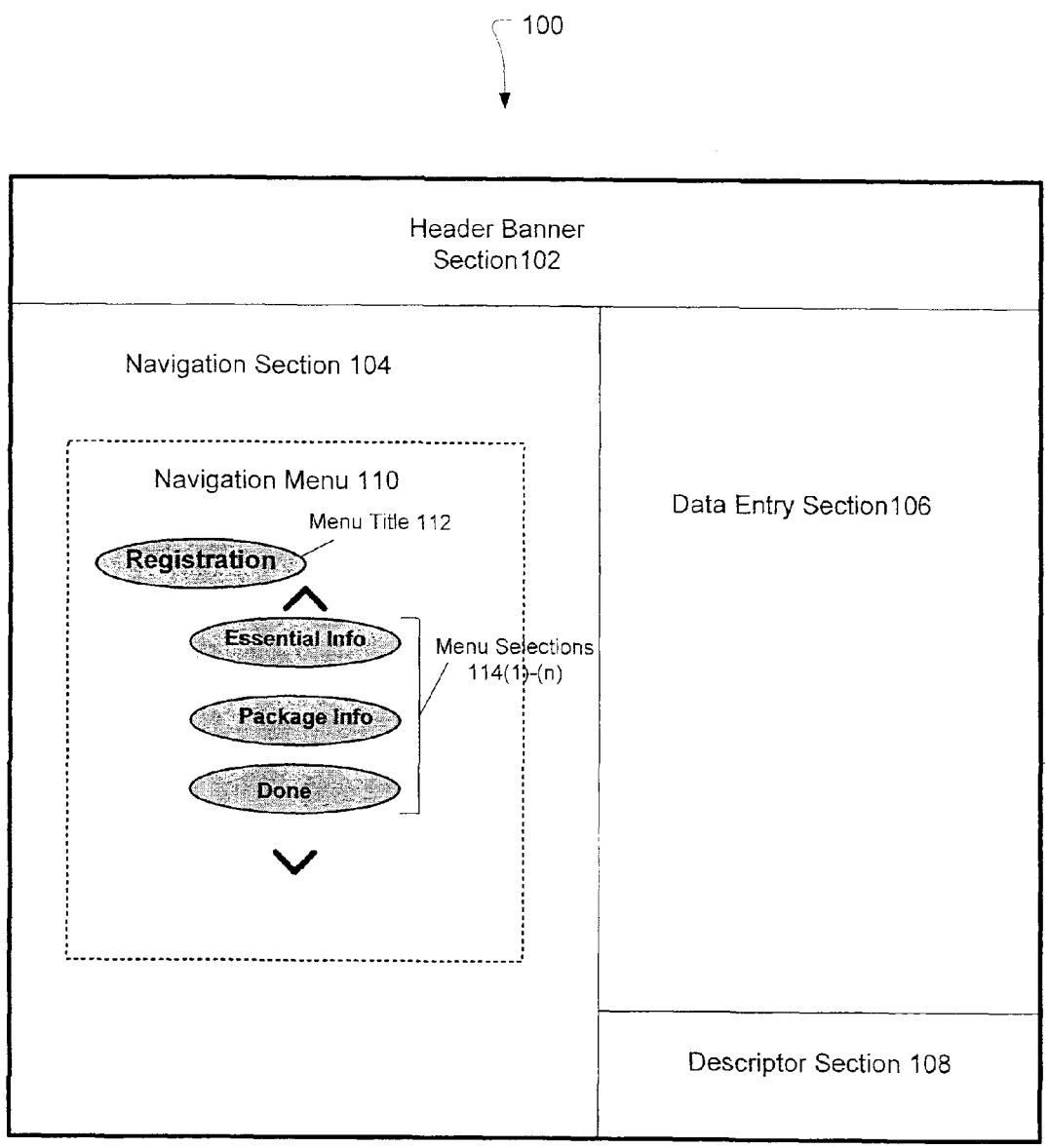
FIG. 1 illustrates one embodiment of a user interface.

Various embodiments of the invention may be generally directed to a user interface that allows for context and language specific data entry. A data entry method is provided that is context and language specific to an activated data entry box. Here, the applicable language and necessary selections or virtual keys required for the activated data entry box are determined. In an embodiment of the invention, the data entry method only displays the necessary virtual keys in the applicable language that the user needs to enter the data required by the activated data entry box. This allows for the data entry method to facilitate the entry of data in any language. Additionally, the number and context of the virtual keys of the data entry method adjust for the type of data currently being asked of the user. In an embodiment of the invention, the data entry method and the data entry boxes are fed via dynamic feed (e.g., metadata, external XML strings, and so forth). This flexible approach to data entry provides a simplified user experienced as well as the freedom to easily and dynamically localize and update the on-screen data entry method when needed.

In some embodiments of the invention, an auto-scrolling feature is provided. With the auto-scrolling feature, the user's focus state remains the same on the user interface while data entry boxes of a data entry menu auto-scroll in such a way that the activated data entry box is always displayed at the same location. Here, a scroll reposition location is defined for the user interface. Each time the user activates a selection or data entry box for a menu, the present invention scrolls the data entry boxes such that the activated box is always displayed at the same location on the user interface. This helps to keep the user's focus state the same on user interface 100 and allows the data entry boxes to remain easily readable, while not unnecessarily sacrificing display real estate. The auto-scrolling feature further simplifies the data entry process by removing from view any data entry box that data has already been entered. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of a user interface 100. User interface 100 may comprise a header banner section 102, a navigation section 104, a data entry section 106 and a descriptor section 108. User interface 100 may be displayed on a display device, for example. Each of these sections is described next in more detail.

Header banner section 102 may be used to display a high-level title for user interface 100. Navigation section 104 may comprise a navigation menu 110. Navigation menu 110 may provide navigation for TV content; service browsing; user registration, set-up, billing and/or personalization for consumer products/services; and so forth. Navigation menu 110 may comprise virtual keys or buttons that are used to navigate user interface 100. The virtual keys of menu 110 may comprise one or more indicia thereon. The virtual keys may comprise any type of indicia to represent any type of information. The indicia may comprise, for example, graphics, icons, letters, characters, symbols, and/or functions. The indicia also may be user defined, for example. In one embodiment, the indicia may comprise characters and/or symbols similar to the characters and/or symbols found in conventional keyboards. The indicia may also comprise information pulled or dynamically updated from other software applications or connected services such as, but not limited to, buddy lists, email contacts, cell phone books, device locations, and so forth. This allows indicia to be pulled from a varied set of information provided by existing applications and/or services which would allow the text entry to be familiar, graphically recognizable and efficient. The various embodiments described herein, however, are not limited in the context of the embodiment illustrated in FIG. 1 as the indicia on the virtual keys may represent any predefined character, symbol, modifier, control, alternative, function, or shift keys.

The virtual keys of navigation section 104 may be activated by a user via a navigation controller. In one embodiment, the navigation controller may be a pointing device or remote control, as will be described below with reference to FIG. 6.

Referring again to FIG. 1, navigation menu 110 may comprise a menu title 112 and one or more menu selections 114(1)-(n), where n is any positive integer. Menu selections 114(1)-(n) may be expandable. In the example user interface of FIG. 1, a user registration menu is shown. Here, menu title 112 is "Registration" and menu selections 114(1)-(n) or registration selections include "Essential Info", "Package Info" and "Done". One or more of menu selections 114(1)-(n) may be activated to present a data entry menu displayed in data entry section 106. In an embodiment of the invention, the menu selections are fed to user interface 100 via dynamic feed (e.g., metadata, external XML strings, and so forth). The example registration menu illustrated in FIG. 1 is not meant to limit the invention. In fact, menu 110 may be any menu utilized to enter data via menu 110 itself or via data entry section 106.

Data entry section 106 displays the data entry menu for the activated selection from menu 110. Descriptor section 108 informs the user of the action currently required in data entry section 106. Sections 106 and 108 are described next in more detail.

Figure 2:
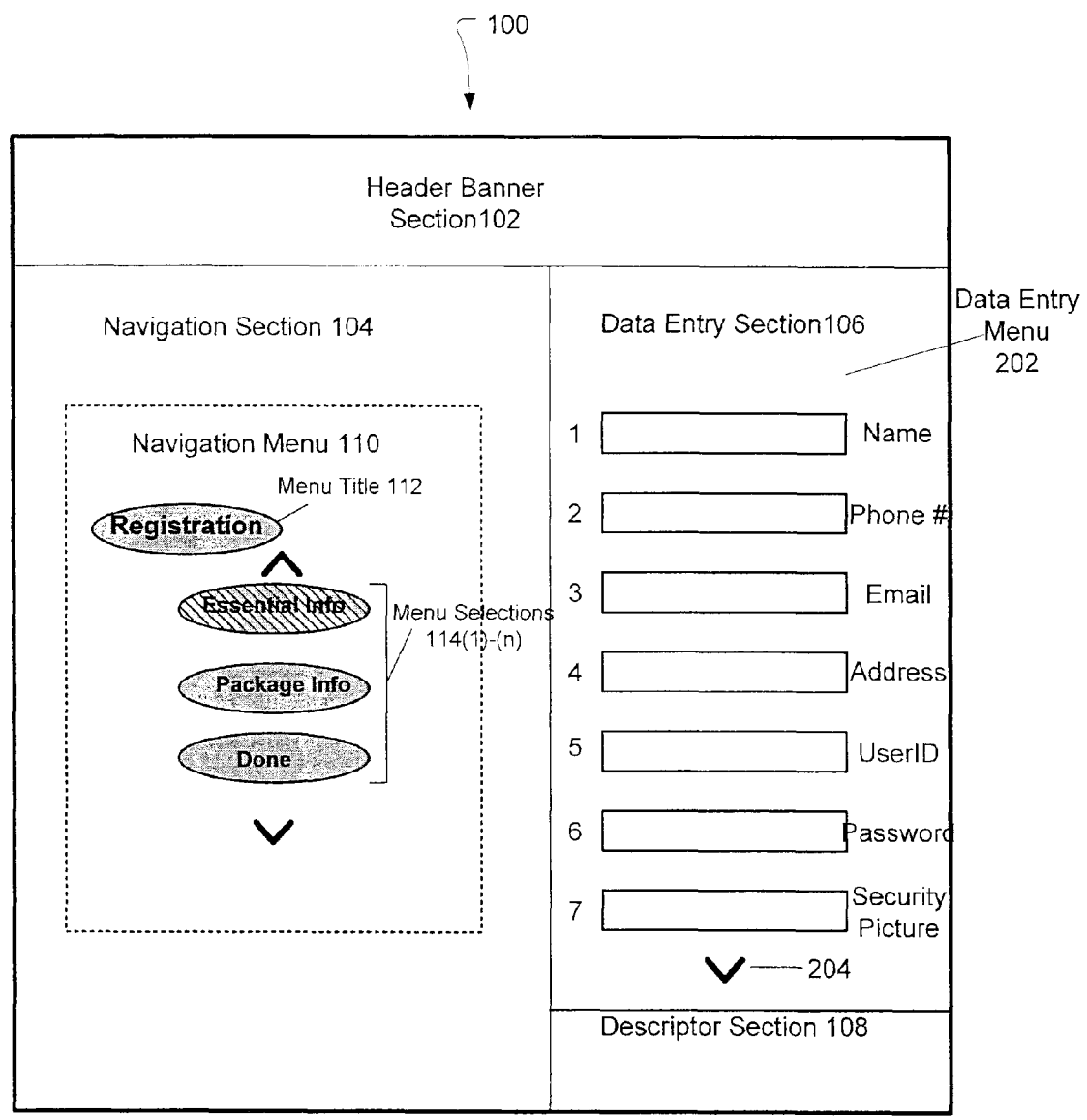
FIG. 2 illustrates one embodiment of a user interface.

Referring to FIG. 2, user registration menu selection "Essential Info" was activated. Based on the particular menu selection that is activated, it is determined whether a data entry menu has been defined for the activated selection. If so, the data entry menu, such as menu 202, is displayed in data entry section 106. In the embodiment illustrated in FIG. 2, menu 202 has at least seven (7) data entry boxes, including "Name", "Phone #", "Email", "Address", "UserID", "Password", and "Security Picture" data entry boxes. In an embodiment of the invention, the down arrow 204 is an indication to the user that additional data entry boxes exist. The data entry boxes of menu 202 may be activated by a user via a navigation controller. In one embodiment, the navigation controller may be a pointing device or remote control, as will be described below with reference to FIG. 6. The example data entry menu 202 is not meant to limit the invention and is provided for illustration purposes only. In fact, menu 202 may comprise may comprise data entry boxes, virtual keys or buttons and so forth.

Figure 3:
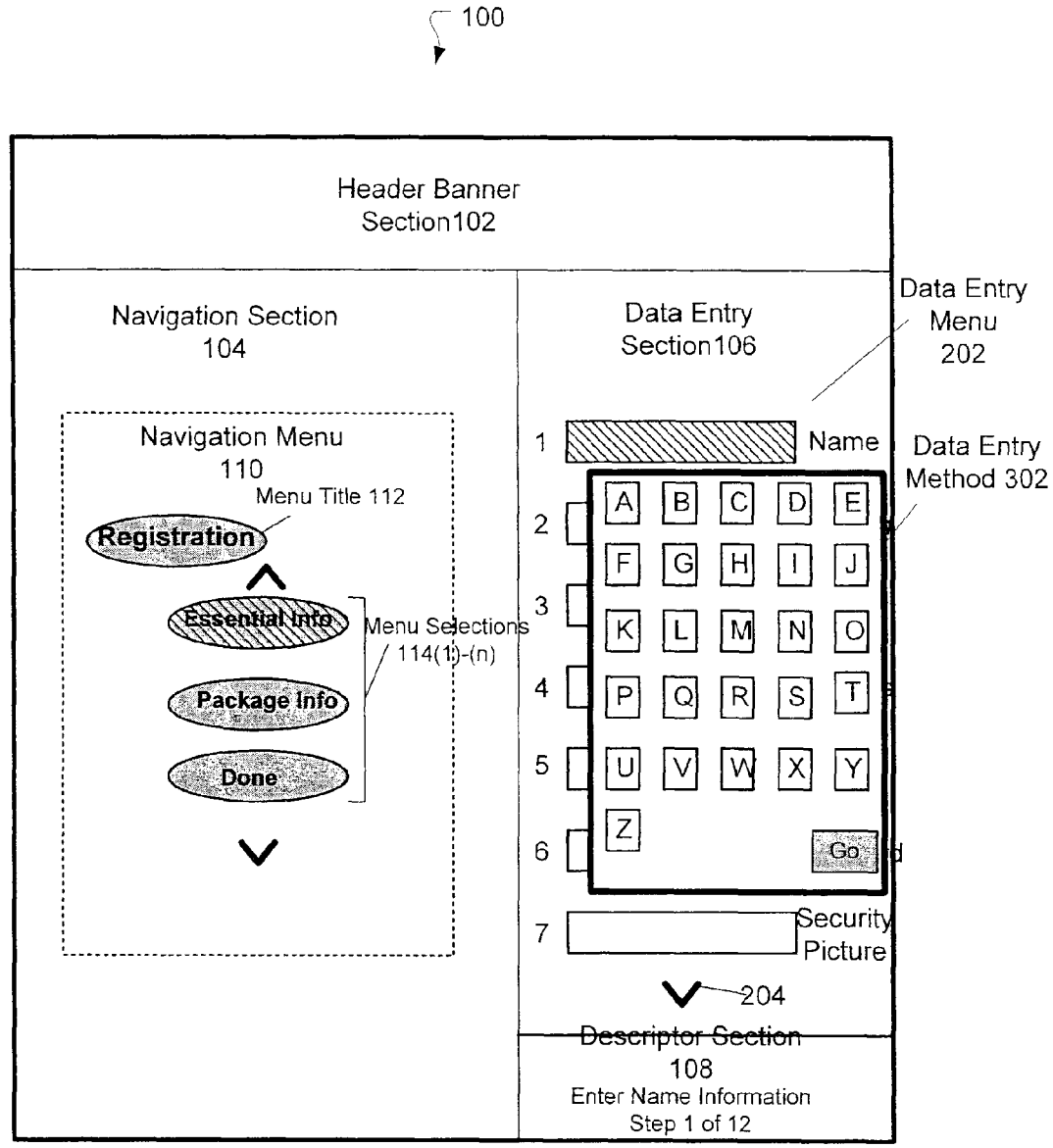
FIG. 3 illustrates one embodiment of a user interface.

Referring again to FIG. 2, one or more of data entry boxes of menu 202, when activated, may cause a data entry method specific to the activated data entry box to be displayed. For example, as illustrated in FIG. 3, data entry box "Name" was activated. It is determined whether a data entry method has been defined for the activated data entry box. If so, the activation of the "Name" data entry box causes data entry method 302 to be displayed directly under the "Name" data entry box.

Data entry method 302 is context and language specific to the activated data entry box. Here, the applicable language and necessary selections or virtual keys required for the activated data entry box are determined. In an embodiment of the invention, data entry method 302 only displays the necessary virtual keys in the applicable language that the user needs to enter the data required by the activated data entry box. This allows for data entry method 302 to facilitate the entry of data in any language. Additionally, the number and context of the virtual keys of data entry method 302 adjust for the type of data currently being asked of the user. In an embodiment of the invention, data entry method 302 and the data entry boxes are fed via dynamic feed (e.g., metadata, external XML strings, and so forth). This flexible approach to data entry provides a simplified user experienced as well as the freedom to easily and dynamically localize and update the on-screen data entry method when needed.

The virtual keys of the data entry method may comprise one or more indicia thereon. The virtual keys may comprise any type of indicia to represent any type of information. The indicia may comprise, for example, graphics, icons, letters, characters, symbols, and/or functions. The indicia also may be user defined, for example. In one embodiment, the indicia may comprise characters and/or symbols similar to the characters and/or symbols found in conventional keyboards. The indicia may also comprise information pulled or dynamically updated from other software applications or connected services such as, but not limited to, buddy lists, email contacts, cell phone books, device locations, and so forth. This allows indicia to be pulled from a varied set of information provided by existing applications and/or services which would allow the text entry to be familiar, graphically recognizable and efficient. The various embodiments described herein, however, are not limited in the context of the embodiment illustrated herein, as the indicia on the virtual keys may represent any predefined character, symbol, modifier, control, alternative, function, or shift keys. The virtual keys of data entry method 302 may be activated by a user via a navigation controller. In one embodiment, the navigation controller may be a pointing device or remote control, as will be described below with reference to FIG. 6.

Figure 4:
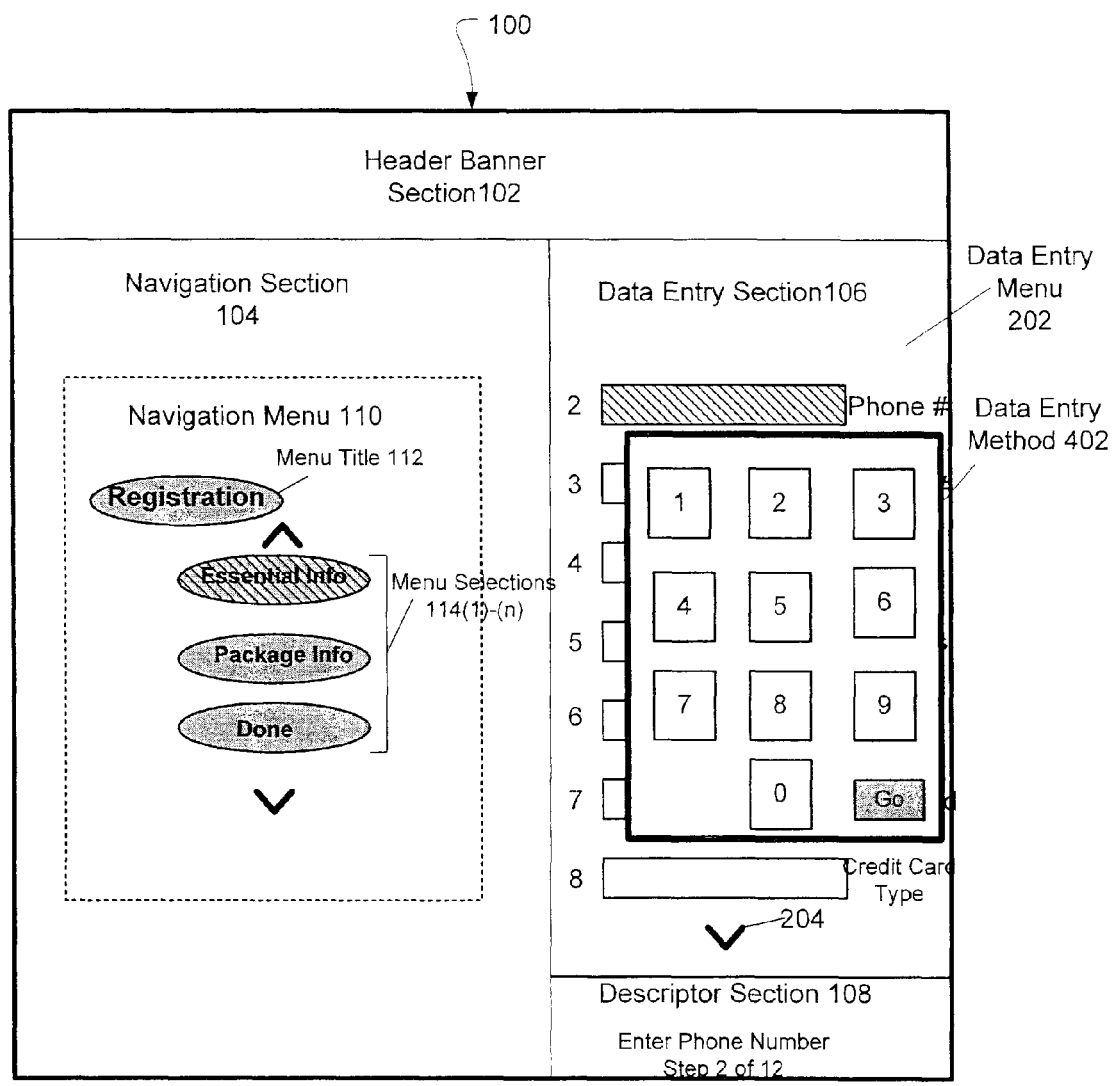
FIG. 4 illustrates one embodiment of a user interface.
Figure 5:
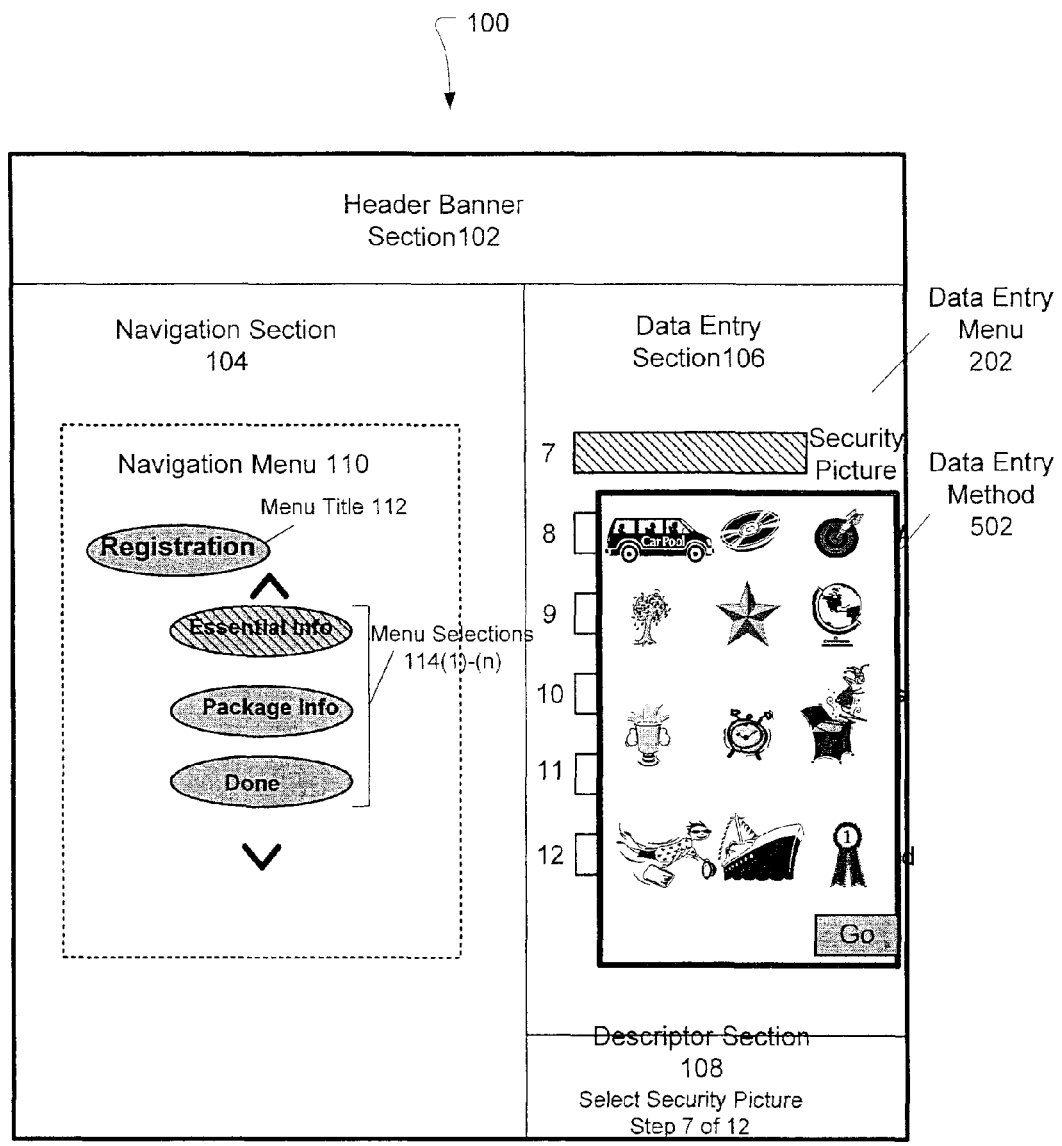
FIG. 5 illustrates one embodiment of a user interface.

Examples of various data entry methods are shown in FIGS. 3-5. For example, in FIG. 3, the "Name" data entry box is asking for the user to enter his or her name in English (as indicated by the data entry box and the text displayed in descriptor section 108). Accordingly, data entry method 302 of FIG. 3 includes virtual keys for each letter of the English alphabet. In an embodiment of the invention, a "Go" key is also included in data entry method 302 that allows the user to indicate when he or she is finished entering the data. FIG. 4 illustrates example data entry method 402 that is context and language specific to the "Phone #" data entry box. Accordingly, data entry method 402 includes virtual keys for each number 0-9. FIG. 5 illustrates example data entry method 502 that is context and language specific to the "Security Picture" data entry box requesting the user to select a security picture. Here, data entry method 502 includes virtual keys for various security pictures that may be selected by the user.

In an embodiment of the invention, menu and data entry method selections may be expandable. Additionally, each of the menu and data entry method selections may represent any variable information. This selection information may be dynamic, adjustable and considered to be independent from any of the other menu and/or data entry method selections. For example, one or more data entry boxes in a data entry menu or virtual keys in a data entry method may be added, deleted or changed without affecting any other menu or data entry method.

In some embodiments of the invention, an auto-scrolling feature is provided. This auto-scrolling feature is also illustrated in FIGS. 3-5. With the auto-scrolling feature, the user's focus state remains the same on user interface 100 while the data entry boxes of the data entry menu auto-scroll in such a way that the activated data entry box is always displayed at the same location. Here, a scroll reposition location is defined for the user interface 100. Each time the user activates a selection or data entry box for the menu, the present invention scrolls the data entry boxes such that the activated box is always displayed at the same location on user interface 100. This auto-scrolling feature simplifies the data entry process by removing from view any data entry box that data has already been entered.

Referring to FIG. 3, the "Name" data entry box is activated and displayed. Once the user is finished entering the "Name" data and activates the "Phone #" data entry box (as illustrated in FIG. 4), the data entry boxes are scrolled up such that the "Name" data entry box is no longer displayed and the "Phone #" data entry box is now repositioned where the previously activated data entry box was displayed (i.e., at the scroll reposition location). A new data entry box "Credit Card Type" that was previously not display, is now displayed at the bottom of sub-menu 202. In FIG. 5, the user activated the "Security Picture" data entry box. Here, the "Security Picture" data entry box is repositioned at the scroll reposition location. The data entry boxes above "Security Picture" data entry box are no longer displayed, but allows for the display of additional boxes below "Security Picture" data entry box. This helps to keep the user's focus state the same on user interface 100 and allows the data entry boxes to remain easily readable, while not unnecessarily sacrificing display real estate.

In the embodiments of the invention illustrated in FIGS. 3-5, the data entry method is positioned or "pops-up" directly below the activated data entry box. In other embodiments of the invention, the display of the data entry method on user interface 100 may be configured to always be displayed on the bottom or the top of menu 202.

Figure 6:
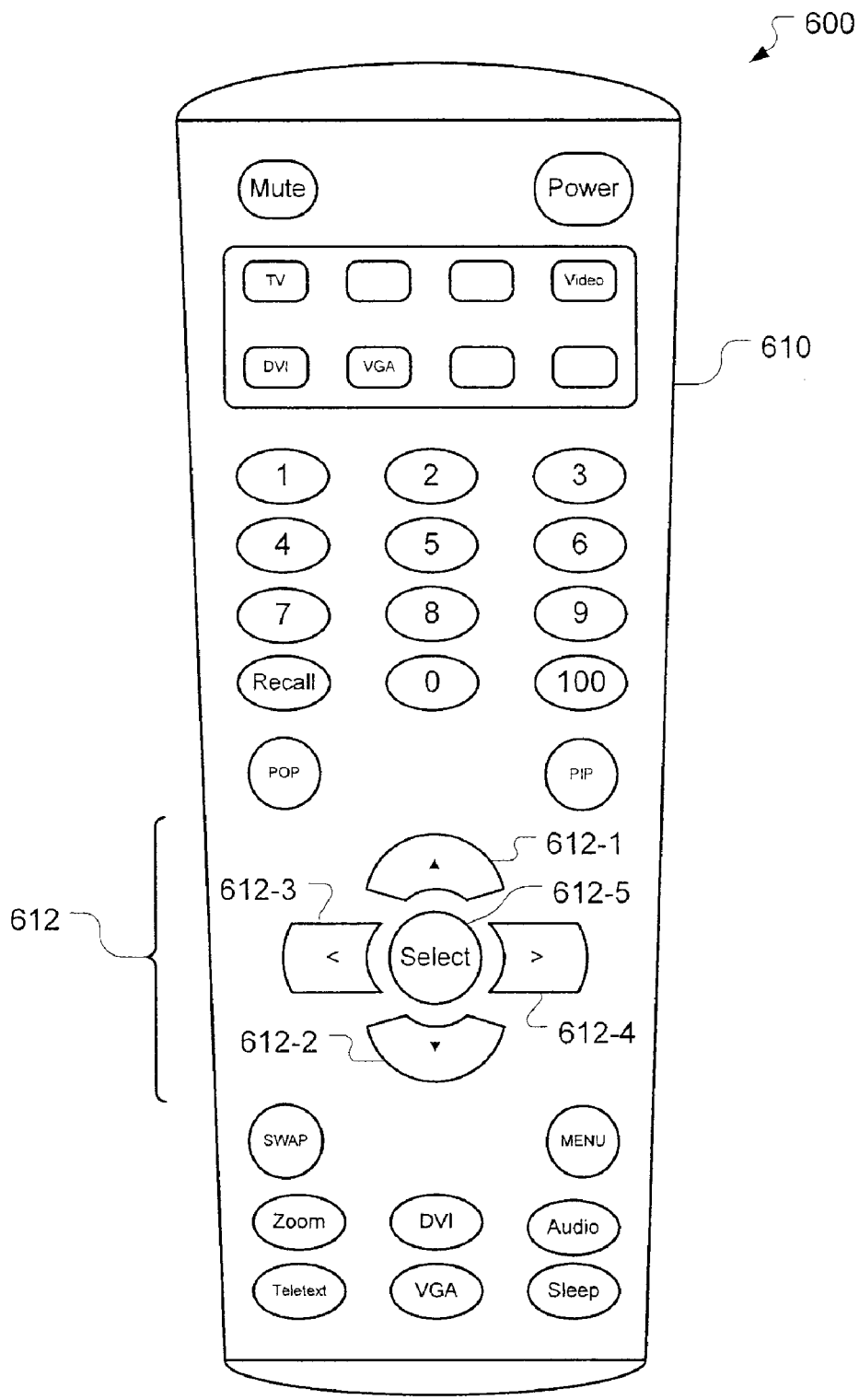
FIG. 6 illustrates one embodiment of a navigation controller.

FIG. 6 illustrates one embodiment of a navigation controller 600. In one embodiment, navigation controller 600 may be a pointing device 610 that may be used to activate one or more keys of navigation section 104 and data entry section 106 (FIG. 1). Pointing device 610 may be any computer hardware component (specifically human interface device) that allows a user to input spatial (i.e., continuous and multi-dimensional) data into a computer. Many systems such as computer aided design (CAD), graphical user interfaces (GUI), and televisions and monitors allow the user to control and provide data to the computer or television using physical gestures—point, click, and drag—typically by moving wired or wireless pointing device such as a mouse, trackball, touchpad, pointing stick, light pen, joystick, head pointer, eye tracking device, digitizing tablet, data glove, remote controller, among others. Movements of pointing device 610 are echoed on a display device by movements of a pointer, cursor, focus ring, or other visual indicators displayed on the display device.

In the illustrated embodiment, pointing device 610 is a conventional remote control unit used to interact with audio/visual devices such as televisions, monitors, cable boxes, digital video disc (DVD) player, compact disc (CD) players, digital video recorders (DVR), video games, digital video camera, and/or digital still camera, among others, for example. Pointing device 610 comprises navigation buttons 612. In one embodiment, navigation buttons 612 comprise an upward navigation button 612-1, a downward navigation button 612-2, a leftward navigation button 612-3, and a rightward navigation button 612-4. Navigation buttons 612 also may comprise a select button 612-5 to execute a particular function. Pointing device 610 may be a wireless remote that operates on wireless principles employing infra-red (IR) energy or radio frequency (RF) energy. In other embodiments, pointing device 610 may be hard wired to the display device, for example. The embodiments, however, are not limited to the elements or in the context shown or described in FIG. 6.

Figure 7:
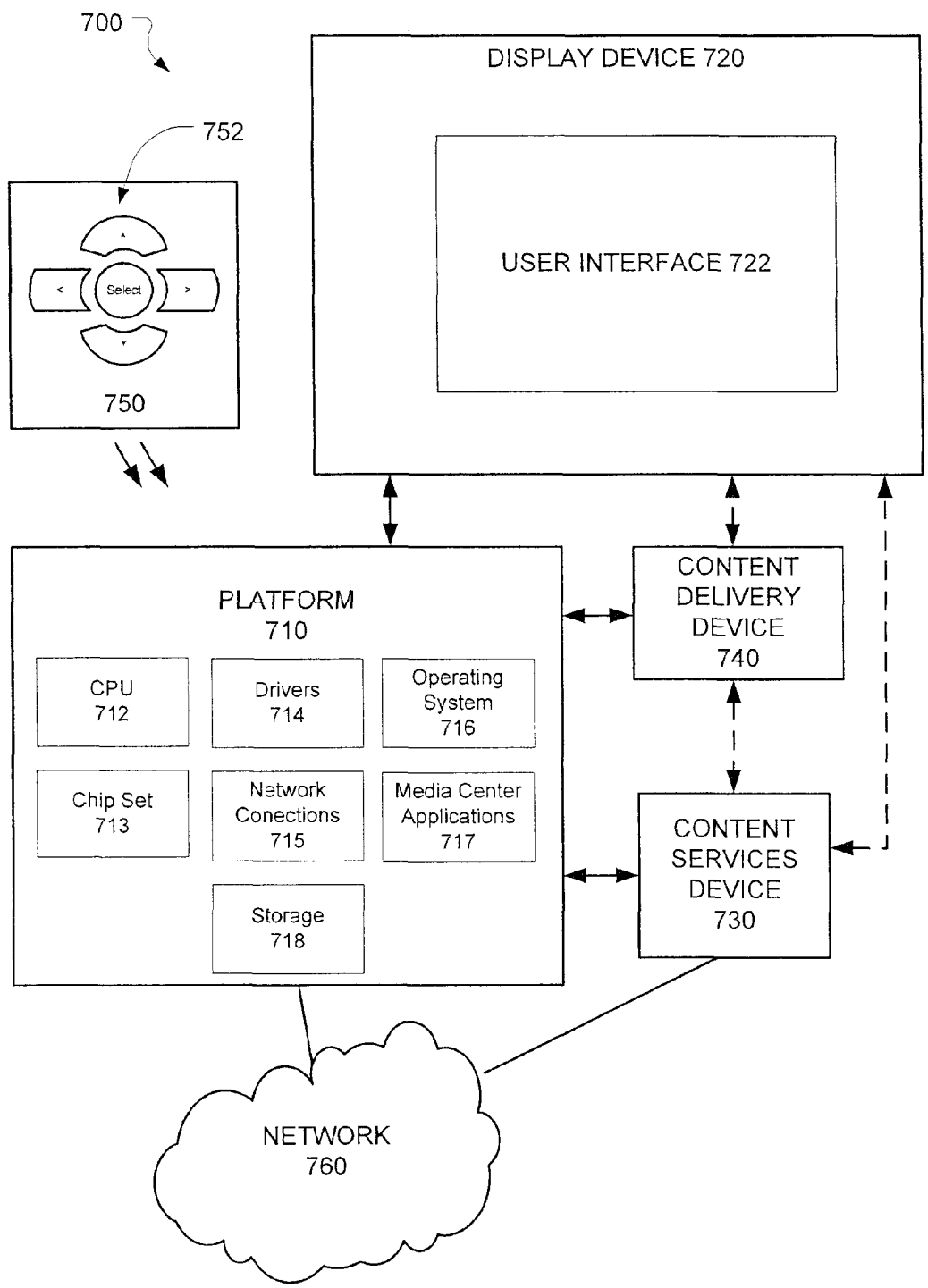
FIG. 7 illustrates one embodiment of a system.

FIG. 7 illustrates one embodiment of a system 700. In one embodiment, system 700 may be a digital home entertainment system although system 700 is not limited in this context. In one embodiment, system 700 comprises a platform 710 coupled to a display device 720. In one embodiment, platform 710 may comprise or may be implemented as a media platform such as the Viiv™ media platform made by Intel® Corporation. In one embodiment, platform 710 may receive content from a content device such as a content services device 730 or a content delivery device 740 or other similar content source. In an embodiment of the invention, content services device 730 may be hosted by any national, international and/or independent service and thus accessible to platform 710 via the Internet. A content services device 730 may be coupled to platform 710 and/or to display device 720. Platform 710 and/or content services device 730 may be coupled to a network 760 to communicate (e.g., send and/or receive) media information to and from network 760. A content delivery device 740 also may be coupled to platform 710 and/or to display device 720. In various embodiments, platform 710 and content services device 730 may be integrated, or platform 710 and content delivery device 740 may integrated, or platform 710, content services device 730, and content delivery device 740 may be integrated, for example. In various embodiments, platform 710 and display device 720 may be an integrated unit and display device, or content service device 730 may be integrated, or display device 720 and content delivery device 740 may integrated. A navigation controller 750 comprising one or more navigation buttons 752 may be used to interact with either platform 710 or display device 720, and/or both, for example.

In one embodiment, platform 710 may comprise a CPU 712, a chip set 713, one or more drivers 714, one or more network connections 715, an operating system 716, and/or a media center application 717 comprising one or more software applications, for example. Platform 710 also may comprise storage 718. Storage 718 may include control and content data used to define one or more navigation menus (e.g., navigation menu 110 of FIG. 1), one or more data entry menus (such as menu 202 of FIG. 2), one or more data entry methods (such as data entry methods 302, 402 and 502 of FIGS. 3-5), one or more text entry boxes, messages, virtual keys and so forth. In an embodiment of the invention, menus, data entry methods, selections, data entry boxes, virtual keys, etc., are fed to user interface 100 via dynamic feed (e.g., metadata and/or external XML strings stored in storage 718). Storage 718 may also include the control and content data displayed in descriptor section 108, as described above in FIG. 1.

In one embodiment, CPU 712 may comprise one or more processors such as dual-core processors. Examples of dual-core processors include the Pentium® D processor and the Pentium® processor Extreme Edition both made by Intel® Corporation, which may be referred to as the Intel Core Duo processors, for example.

In one embodiment, chip set 713 may comprise any one of or all of the Intel® 945 Express Chipset family, the Intel® 955X Express Chipset, Intel® 975X Express Chipset family, plus ICH7-DH or ICH7-MDH controller hubs, which all are made by Intel® Corporation.

In one embodiment, drivers 714 may comprise the Quick Resume Technology Drivers made by Intel® to enable users to instantly turn on and off platform 710 like a television with the touch of a button after initial boot-up, when enabled, for example. In addition, chip set 713 may comprise hardware and/or software support for 5.1 surround sound audio and/or high definition 7.1 surround sound audio, for example. Drivers 714 may include a graphics driver for integrated graphics platforms. In one embodiment, the graphics driver may comprise a peripheral component interconnect (PCI) Express graphics card.

In one embodiment, network connections 715 may comprise the PRO/1000 PM or PRO/100 VE/VM network connection, both made by Intel® Corporation.

In one embodiment, operating system 716 may comprise the Windows® XP Media Center made by Microsoft® Corporation. In one embodiment, one or more media center applications 717 may comprise a media shell to enable users to interact with content using navigation controller 750 (e.g., remote control) from a distance of about 10-feet away from platform 710 or display device 720, for example. In one embodiment, the media shell may be referred to as a "10-feet user interface," for example. In addition, one or more media center applications 717 may comprise the Quick Resume Technology made by Intel®, which allows instant on/off functionality and may allow platform 710 to stream content to media adaptors or other content services devices 730 or content delivery devices 740 when the platform is turned "off."

In one embodiment, storage 718 may comprise the Matrix Storage technology made by Intel® to increase the storage performance enhanced protection for valuable digital media when multiple hard drives are included, for example.

In one embodiment, display device 720 may comprise any television type monitor or display. Display device 720 may comprise, for example, a computer display screen, video monitor, television-like device, and/or a television. Display device 720 may be digital and/or analog.

In various embodiments, content services device 730 may comprise a cable television box, personal computer, network, telephone, Internet enabled devices or appliance capable of delivering digital information and/or content, and any other similar device capable of unidirectionally or bidirectionally communicating content between content providers and platform 710 and/display device 720, via network 760. It will be appreciated that the content may be communicated unidirectionally and/or bidirectionally to and from any one of the components in system 700 and a content provider via network 760. Examples of content may include any media information including, for example, video, music, and gaming information. Content services device 730 receives content such as cable television programming including media information, digital information, and/or other content. Examples of content providers may include any cable or satellite television or radio content providers and may include, for example, ESPN, Movielink, and MTV Overdrive for video; Napster, AOL and Tiscali for music; Gametap, Square Enix and T-Online for gaming; and YouTube and Flickr for sharing services.

In various embodiments, content delivery device 740 may comprise a DVD player, CD player, DVR, video game, digital video camera, digital still camera, and/or MP3 (MPEG-1 Audio Layer 3 where MPEG stands for Moving Pictures Experts Group) player, among others, for example.

Platform 710 may receive content from network 760 directly or via content services device 730. Platform 710 may receive content from content delivery device 740. Under the control of one or more software applications, such as media center application 717, platform 710 displays user interface 722 (e.g., user interface 100) on display device 720.

In one embodiment, platform 710 may receive control signals from navigation controller 750 (e.g., navigation controller 600 of FIG. 6). Navigation buttons 752 (e.g., navigation buttons 612 of FIG. 6) may be used to interact with user interface 722. For example, under the control of software applications, e.g., media center applications 717, navigation buttons 752 located on navigation controller 750 may be mapped to the virtual navigation keys of navigation section 104 and data entry section 106 (FIG. 1), data entry menu 202 (FIG. 2) and data entry methods (FIGS. 3-5).

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 710 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Operations for the above embodiments may be further described with reference to the following figure and accompanying examples. Although such figure presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof.

Figure 8:
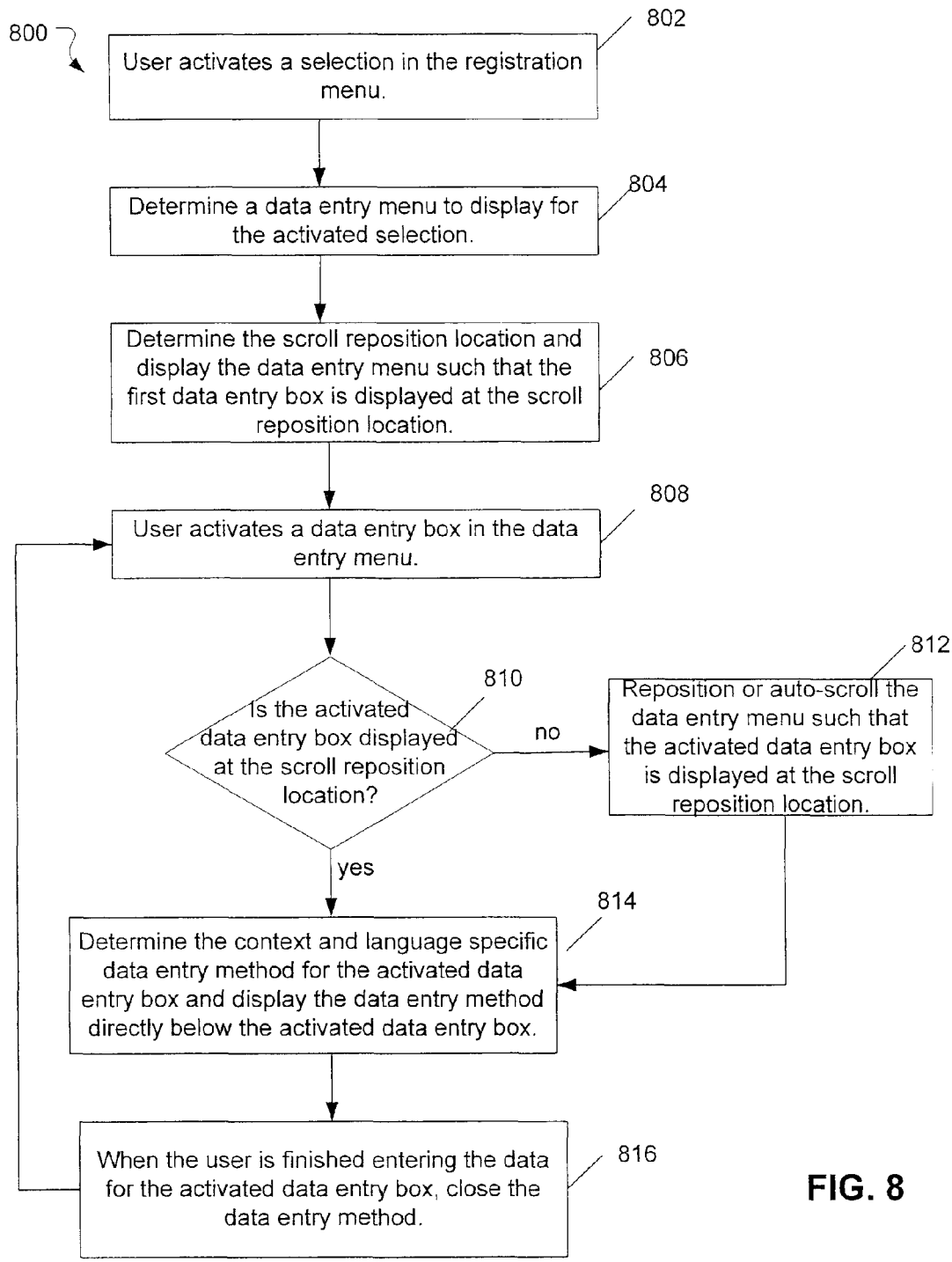
FIG. 8 illustrates one embodiment of a logic flow.

FIG. 8 illustrates one embodiment of a logic flow 800. The logic flow 800 may be representative of the operations executed by one or more embodiments described herein, for example, the operations executed by system 700. In one embodiment, logic flow 800 may be representative of the operations executed by a processor (e.g., the CPU 712) under the control of one more software applications (e.g., media center applications 717). Platform 710 comprising processor 712 provides the necessary information to display device 720 to map user interface 722 on display device 720. The embodiments of the invention, however, are not limited to the elements or in the context shown or described in FIG. 8.

As shown in logic flow 800, a user activates a selection in a menu (such as navigation menu 110 of FIG. 1), at block 802. In an embodiment of the invention, the navigation menu represents a registration menu and includes one or more menu selections. The user may activate or select the menu selections via a pointing device or remote control (such as pointing device 610 of FIG. 6).

At block 804, the data entry menu to display for the activated selection is determined. According to one embodiment of the invention, the menu includes multiple data entry boxes to be displayed in data entry section 106 (FIG. 1).

At block 806, a scroll reposition location is determined. The data entry menu is then displayed in section 106 such that the first data entry box is automatically displayed at the scroll reposition location (without the first data entry box being activated by the user). As discussed above, the scroll reposition location is used to facilitate the auto-scrolling feature. Here, the user's focus state remains the same on user interface 100 while the data entry boxes of the menu auto-scroll in such a way that the activated data entry box is always displayed at the same location.

At block 808, the user activates a data entry box in the data entry menu. The user may activate or select the menu selections via a pointing device or remote control (such as pointing device 610 of FIG. 6).

At block 810, it is determined whether the activated data entry box is displayed at the scroll reposition. If not, then at block 812, the data entry boxes of the data entry menu is repositioned or auto-scrolled such that the activated data entry box is displayed at the scroll reposition location.

At block 814, the data entry method for the activated data entry box is determined and displayed directly below the activated data entry box. In other embodiments of the invention, the data entry box is placed at any other predetermined location on the user interface. The data entry method is context and language specific to the activated data entry box. Here, the applicable language and necessary selections or virtual keys required for the activated data entry box are determined. In an embodiment of the invention, the data entry method only displays the necessary virtual keys in the applicable language that the user needs to enter the data required by the activated data entry box. This allows for the data entry method to facilitate the entry of data in any language. Additionally, the number and context of the virtual keys of the data entry method adjust for the type of data currently being asked of the user.

At block 815, when the user is finished entering data for the activated data entry box, the data entry method is closed. The closing of the data entry method allows the user to view all displayed data entry boxes. The logic flow in FIG. 8 allows for the user to activate another data entry box in the menu at block 808.

Figure 9:
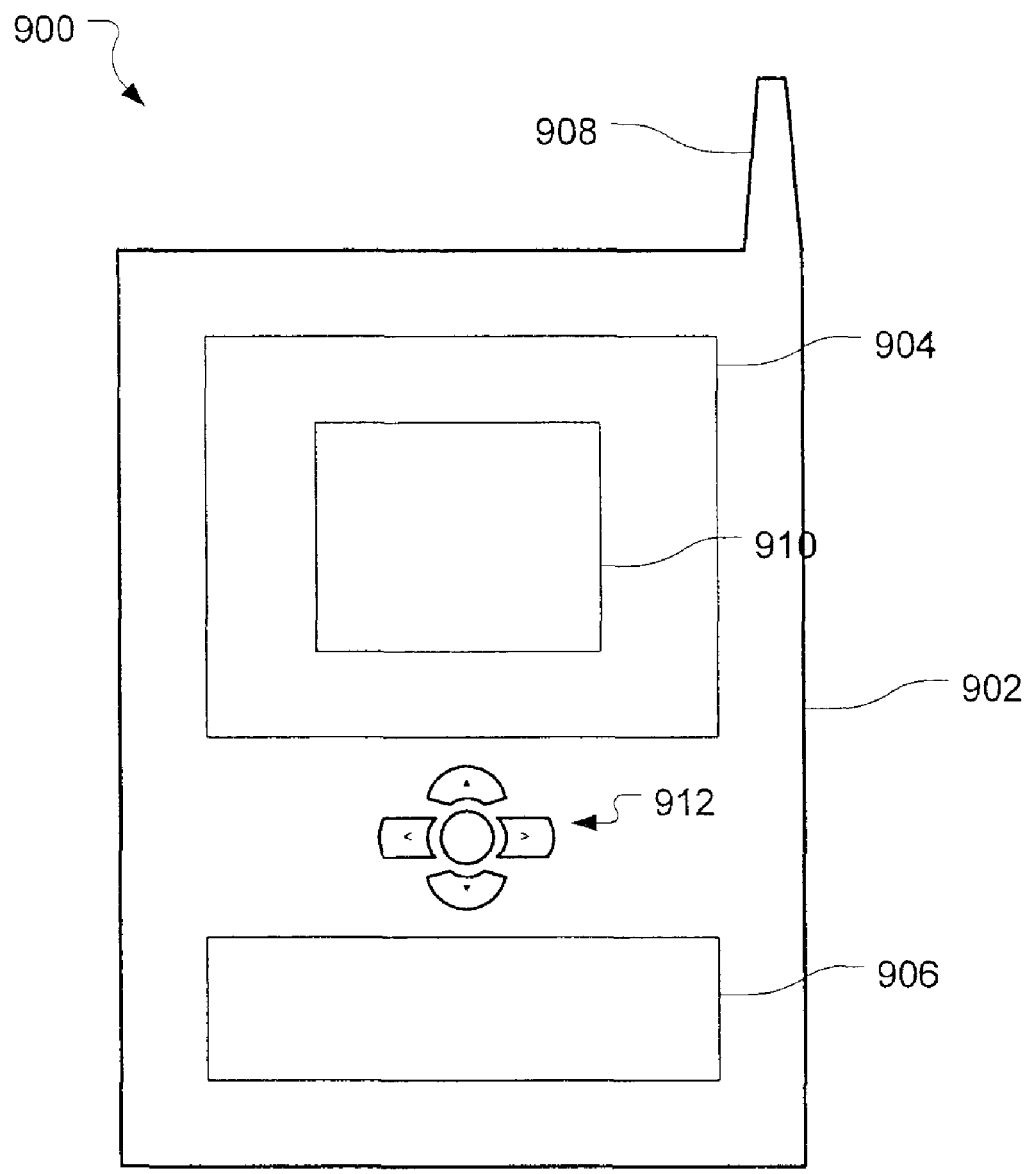
FIG. 9 illustrates one embodiment of a device.

FIG. 9 illustrates one embodiment of a device 900. In one embodiment, for example, device 900 may comprise a communication system. In various embodiments, device 900 may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, and so forth. The embodiments are not limited in this context.

In one embodiment, device 900 may be implemented as part of a wired communication system, a wireless communication system, or a combination of both. In one embodiment, for example, device 900 may be implemented as a mobile computing device having wireless capabilities. A mobile computing device may refer to any device having a processing system and a mobile power source or supply, such as one or more batteries, for example. Examples of a mobile computing device may include a laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth. Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may comprise a housing 902, a display 904, an input/output (I/O) device 906, and an antenna 908. Device 900 also may comprise a five-way navigation button 912. I/O device 906 may comprise a suitable keyboard, a microphone, and/or a speaker, for example. Display 904 may comprise any suitable display unit for displaying information appropriate for a mobile computing device. I/O device 906 may comprise any suitable I/O device for entering information into a mobile computing device. Examples for I/O device 906 may include an alphanumeric keyboard, a numeric keypad, a touch pad, input keys, buttons, switches, rocker switches, voice recognition device and software, and so forth. Information also may be entered into device 900 by way of microphone. Such information may be digitized by a voice recognition device. The embodiments are not limited in this context.

Device 900 may comprise a user interface 910 that may be displayed on display 904 similar to user interface 100 discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of displaying a user interface on a display device, comprising:
    displaying the user interface on the display device, wherein the user interface includes a data entry menu having one or more menu selections;
    activating one of the one or more menu selections; and
    displaying a data entry method, wherein the data entry method displayed is different depending on a specific context of the activated menu selection, wherein the activated menu selection requires the user to enter data into a plurality of simultaneously displayed data entry boxes, of which at least one data entry box requires alphabetic input and at least one data entry box requires numerical data,
    wherein only a virtual keyboard enabled to receive alphabetic input is displayed in the data entry method on the display device when alphabetic user input is required by the activated user selection in the data entry box requiring alphabetic input, and only a virtual keypad enabled to receive numeric input is displayed in the data entry method on the display device when numeric user input is required by the activated user selection in the data entry box requiring numeric input.

2. The method of claim 1, wherein the data entry method includes a method of entering one of name, phone number and email.

3. The method of claim 1, wherein the data entry method is displayed on the bottom of the user interface.

4. The method of claim 1, wherein the virtual keyboard enabled to receive alphabetic input may be changed without changing the virtual keypad enabled to receive numeric input.

5. The method of claim 1, wherein the virtual keypad enabled to receive numeric input may be changed without changing the virtual keyboard enabled to receive alphabetic input.

6. The method of claim 1, wherein the display device is a mobile computing device.

7. The method of claim 1, wherein the one or more menu selections comprise one or more data entry boxes.

8. The method of claim 1, wherein each of the one or more menu selections and the one or more data entry method selections are adjustable and independent from any of the other menu and data entry method selections.

9. An apparatus, comprising:
    a processor to display a user interface on a display device, wherein the user interface includes a data entry menu having one or more menu selections, wherein the processor to activate one of the one or more menu selections to display a data entry method, wherein the data entry method displayed is different depending on a specific context of the activated menu selection, wherein the activated menu selection requires the user to enter data into a plurality of simultaneously displayed data entry boxes, of which at least one data entry box requires alphabetic input and at least one data entry box requires numerical data,
    wherein only a virtual keyboard enabled to receive alphabetic input is displayed in the data entry method on the display device when alphabetic user input is required by the activated user selection in the data entry box requiring alphabetic input, and only a virtual keypad enabled to receive numeric input is displayed in the data entry method on the display device when numeric user input is required by the activated user selection in the data entry box requiring numeric input.

10. The apparatus of claim 9, wherein the data entry method includes a method of entering one of name, phone number and email.

11. The apparatus of claim 9, wherein the data entry method is displayed on the bottom of the user interface.

12. The apparatus of claim 9, wherein the virtual keyboard enabled to receive alphabetic input may be changed without changing the virtual keypad enabled to receive numeric input.

13. The apparatus of claim 9, wherein the virtual keypad enabled to receive numeric input may be changed without changing the virtual keyboard enabled to receive alphabetic input.

14. The apparatus of claim 9, wherein the display device is a mobile computing device.

15. The apparatus of claim 9, wherein the one or more menu selections comprise one or more data entry boxes.

16. The apparatus of claim 9, wherein each of the one or more menu selections and the one or more data entry method selections are adjustable and independent from any of the other menu and data entry method selections.

17. A non-transitory computer-readable storage medium containing instructions which, when executed by a processing system, cause the processing system to perform a method, the method comprising: displaying a user interface on a display device, wherein the user interface includes a data entry menu having one or more menu selections; activating one of the one or more menu selections; and displaying a data entry method, wherein the data entry method displayed is different depending on a specific context of the activated menu selection, wherein the activated menu selection requires the user to enter data into a plurality of simultaneously displaced data entry boxes, of which at least one data entry box requires alphabetic input and at least one data entry box requires numerical data, wherein only a virtual keyboard enabled to receive alphabetic input is displayed in the data entry method on the display device when alphabetic user input is required by the activated user selection in the data entry box requiring alphabetic input, and only a virtual keypad enabled to receive numeric input is displayed in the data entry method on the display device when numeric user input is required by the activated user selection in the data entry box requiring numeric input.

18. The computer-readable storage medium of claim 17, wherein the data entry method includes a method of entering one of name, phone number and email.

19. The computer-readable storage medium of claim 17, wherein the data entry method is displayed on the bottom of the user interface.

20. The computer-readable storage medium of claim 17, wherein the virtual keyboard enabled to receive alphabetic input may be changed without changing the virtual numeric keypad.

21. The computer-readable storage medium of claim 17, wherein the virtual keypad enabled to receive numeric input may be changed without changing the virtual alphabetic keyboard.

22. The computer-readable storage medium of claim 17, wherein the display device is a mobile computing device.

23. The computer-readable storage medium of claim 17, wherein the one or more menu selections comprise one or more data entry boxes.

24. The computer-readable storage medium of claim 17, wherein each of the one or more menu selections and the one or more data entry method selections are adjustable and independent from any of the other menu and data entry method selections.

25. A method, comprising:
displaying a user interface on a display device, wherein the user interface includes one or more selections;
activating one of the one or more selections; and
displaying a data entry method, wherein the data entry method is context and language specific to the activated selection by displaying one or more virtual keys for a user to enter data required by the activated selection, wherein the activated selection requires the user to enter data into a plurality of simultaneously displayed data entry boxes, of which at least one data entry box requires alphabetic input and at least one data entry box requires numerical data,
wherein a virtual alphabetic keyboard is displayed in the data entry method on the display device when alphabetic user input is required by the activated selection in the data entry box requiring alphabetic input, and a virtual numeric keypad is displayed in the data entry method on the display device when numeric user input is required by the activated selection in the data entry box requiring numeric input.

26. The method of claim 25, wherein the data entry method is capable of switching between the virtual alphabetic keyboard and the virtual numeric keypad.

27. The method of claim 25, wherein the display device is a mobile computing device.

28. The method of claim 27, wherein the mobile computing device is a wireless computing device with an antenna.

29. The method of claim 25, wherein the data entry method is displayed below the activated selection on the user interface.

30. An apparatus, comprising:
a processor to display a user interface on a display device, wherein the user interface includes one or more selections, wherein the processor to activate one of the one or more selections to display a data entry method, wherein the data entry method displayed is different depending on a specific context of the activated selection, wherein the activated selection requires the user to enter data into a plurality of simultaneously displayed data entry boxes, of which at least one data entry box requires alphabetic input and at least one data entry box requires numerical data,
wherein a virtual alphabetic keyboard is displayed in the data entry method on the display device when alphabetic user input is required by the activated selection in the data entry box requiring alphabetic input, and a virtual numeric keypad is displayed in the data entry method on the display device when numeric user input is required by the activated selection in the data entry box requiring numeric input.

31. The apparatus of claim 30, wherein the data entry method is capable of switching between the virtual alphabetic keyboard and the virtual numeric keypad.

32. The apparatus of claim 30, wherein the apparatus is a mobile computing device.

33. The apparatus of claim 32, wherein the mobile computing device is a wireless computing device with an antenna.

34. The apparatus of claim 30, wherein the data entry method is displayed below the activated selection on the user interface.

35. A non-transitory computer-readable storage medium containing instructions which, when executed by a processing system, cause the processing system to perform a method, the method comprising: displaying a user interface on a display device, wherein the user interface includes one or more selections; activating one of the one or more selections; and displaying a data entry method, wherein the data entry method is context and language specific to the activated selection by displaying one or more virtual keys for a user to enter data required by the activated selection, wherein the activated selection requires the user to enter data into a plurality of simultaneously displaced data entry boxes, of which at least one data entry box requires alphabetic input and at least one data entry box requires numerical data, wherein a virtual alphabetic keyboard is displayed in the data entry method on the display device when alphabetic user input is required by the activated selection in the data entry box requiring alphabetic input, and a virtual numeric keypad is displayed in the data entry method on the display device when numeric user input is required by the activated selection in the data entry box requiring numeric input.

36. The computer-readable storage medium of claim 35, wherein the data entry method is capable of switching between the virtual alphabetic keyboard and the virtual numeric keypad.

37. The computer-readable storage medium of claim 35, wherein the display device is a mobile computing device.

38. The computer-readable storage medium of claim 37, wherein the mobile computing device is a wireless computing device with an antenna.

39. The computer-readable storage medium of claim 35, wherein the data entry method is displayed below the activated selection on the user interface.

* * * * *